United States Patent Office 3,011,001
Patented Nov. 28, 1961

3,011,001
PREPARATION OF SOLID ORGANOBORON COMPOUNDS
Donald J. Mangold, Youngstown, James E. McCarthy, Niagara Falls, and Sheldon L. Clark, Kenmore, N.Y., assignors, by mesne assignments, to Olin Mathieson Chemical Corporation, a corporation of Virginia
No Drawing. Filed Dec. 18, 1956, Ser. No. 629,196
2 Claims. (Cl. 260—606.5)

This invention relates to fuels and, more particularly, to solid fuels in which an organoboron compound is an essential constituent.

The fuels of this invention, when incorporated with suitable oxidizers such as ammonium perchlorate, potassium perchlorate, ammonium nitrate, etc., yield solid propellants suitable for rocket power plants and other jet propelled devices. Such propellants burn with high flame speeds, have high heats of combustion and are of the high specific impulse type. Probably the most important single factor in determining the performance of a propellant charge is the specific impulse; appreciable increases in performances will result from the use of higher specific impulse materials. The fuels of this invention when incorporated with oxidizers are capable of being formed into a wide variety of grains, tablets, and shapes, all with desirable mechanical and chemical properties. Propellants produced by the methods described in this application will be found to burn uniformly without disintegration and to be mechanically strong enough to withstand ordinary handling.

According to this invention, the solid organoboron compounds are obtained by a two stage process which includes reacting an olefin hydrocarbon having from 2 to 5 carbon atoms and diborane in a carrier stream of an inert gas at a temperature of about 100° to 150° C. in a first reaction stage and then pyrolizing the first reaction effluent at a temperature of about 350° to 450° C. in a second reaction stage. The pressure in each reaction stage can vary from 0 to 15 p.s.i.g. The molar ratio of olefin hydrocarbon with respect to diborane is about 2–10:1 and that of the inert gas to diborane is about 10–40:1. The residence time of the gases in each reaction stage is about 1–10 seconds determined at standard conditions of temperature and pressure, i.e. 760 mm. Hg and 0° C. Suitable olefin hydrocarbons are, for example, ethylene, propylene, butylene, amylene and mixtures thereof. Suitable inert gases are, for example, hydrogen and nitrogen.

The following experimental example further illustrates this invention and is to be considered not limitive.

*Example I*

In this experiment the first reaction stage was a sparger reactor and the second reaction stage was a hot tube reactor.

The sparger reactor was an elongated tube, about 26 centimeters long with a 33 mm. diameter substantially enclosed in a hot oil jacket, having longitudinally situated therein a smaller perforated or disparger tube. Separate manifolds for the reactant gases were connected to the elongated tube and to the disparger tube.

The hot tube reactor was a tube about 33 centimeters in length with a 28 mm. diameter. It had a heated voluume of 173 milliliters and was connected to the exit end of the sparger reactor.

A stream of diborane diluted with 13.3 times its volume of hydrogen and a stream of ethylene diluted with 2.2 times its volume of hydrogen were separately and continuously introduced into the top of the sparger reactor for a period of 45 minutes. Diborane at the rate of 60 ml. at S.T.P. per minute and hydrogen at the rate of 800 ml. per minute were introduced into the annular space surrounding the disparger tube through an inlet at the top of the reactor and ethylene at the rate of 360 ml. at S.T.P. per minute and hydrogen at the rate of 800 ml. at S.T.P. per minute were introduced into the top of the disparger tube. The temperature of the gas stream in the sparger reactor was maintained at 135° C. and the residence time in the sparger reactor for the gases was 4.4 seconds at S.T.P. An infrared analysis of a sample of the gases leaving the sparger reactor indicated the presence of triethylborane. This sample analyzed 89.4% hydrogen, 2% methane and 2.1% ethane. Another sample analyzed 36.6% hydrogen, and 3.1% triethylborane.

The gases from the sparger reactor were immediately passed through the hot tube reactor at 406–434° C. The residence time of the gas in the hot tube reactor was 4.0 seconds at S.T.P. The products from the hot tube were passed into a trap maintained at room temperature, where the solid products were collected. The unreacted gases and hydrogen diluent passed through the trap were scrubbed with ethyl alcohol and then vented to the air through Nujol. The 251 grams of ethyl alcohol used for scrubbing contained 0.08% by weight of diborane after the completion of the experiment.

About three grams of solids collected near the entrance to the hot tube reactor and about 5 grams collected near the exit from the hot tube.

An analysis of the solids obtained near the entrance of the hot tube reactor showed that they contained 58 percent boron, 16 percent carbon and 4 percent hydrogen. The solids at the exit of the hot tube were analyzed and found to contain 45 percent boron, 27 percent carbon and 6 percent hydrogen. The solid products from this reaction are non-pyrophoric.

The boron-containing solid materials produced by practicing the method of this invention can be employed as ingredients of solid propellant compositions in accordance with general procedures which are well-understood in the art, inasmuch as the solids produced by practicing the present process are readily oxidized using conventional solid oxidizers such as ammonium perchlorate, potassium perchlorate, sodium perchlorate, ammonium nitrate, etc. In formulating a solid propellant composition using one of the materials produced by the present invention, generally from 10 to 35 parts by weight of boron-containing solids and from 65 to 90 parts by weight of oxidizer, such as ammonium perchlorate, are present in the final propellant composition. In the propellant, the oxidizer and the product of the present process are formulated in admixture with each other, as by finely subdividing each of the materials separately and thereafter combining them. The purpose of doing this is to provide proper burning characteristics in the final propellant. In addition to the oxidizer and the oxidizable materials, the final propellant can also contain an artificial resin, generally of the urea-formaldehyde or phenol-formaldehyde type, the function of the resin being to give the propellant mechanical strength and at the same time improve its burning characteristics. Thus in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of the resin is about 5 to 10 percent by weight, based upon the weight of the oxidizer and boron compound. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant composition, reference is made to U.S. Patent 2,622,277 to Bonnell et al. and U.S. Patent 2,646,596 to Thomas et al.

We claim:
1. A two-stage method for the preparation of solid organoboron compounds which includes reacting in a first reaction stage an olefin hydrocarbon having from 2 to 5 carbon atoms and diborane in a molar ratio of about 2–10:1 in a carrier stream of an inert diluent gas in an amount by volume based on the diborane of about 10–40:1 at a temperature of from about 100° to 150° C. for from 1 to 10 seconds determined at standard conditions of temperature and pressure, passing the effluent from the first reaction stage to a second reaction stage, pyrolizing the first reaction effluent in the second reaction stage at a temperature of about 350° to 450° C. for from about 1 to 10 seconds determined at standard conditions of temperature and pressure, and separating the solid reaction products from the reaction mixture.

2. The method of claim 1 in which the inert gas is hydrogen and the olefin hydrocarbon is ethylene.

No references cited.